(12) United States Patent
Bowman et al.

(10) Patent No.: US 10,024,467 B2
(45) Date of Patent: Jul. 17, 2018

(54) FITTINGS HAVING ARCUATE STIFFNESS RIBS

(71) Applicant: Victaulic Company, Easton, PA (US)

(72) Inventors: Matthew A. Bowman, Palmer, PA (US); James R. Van Wert, Jr., Franklin, OH (US)

(73) Assignee: Victaulic Company, Easton, PA (US)

( * ) Notice: Subject to any disclaimer, the term of this patent is extended or adjusted under 35 U.S.C. 154(b) by 685 days.

(21) Appl. No.: 14/333,580

(22) Filed: Jul. 17, 2014

(65) Prior Publication Data

US 2015/0021911 A1 Jan. 22, 2015

Related U.S. Application Data

(60) Provisional application No. 61/847,354, filed on Jul. 17, 2013, provisional application No. 61/847,356, filed on Jul. 17, 2013.

(51) Int. Cl.
*F16L 21/00* (2006.01)
*F16L 17/04* (2006.01)
(Continued)

(52) U.S. Cl.
CPC ............ *F16L 21/005* (2013.01); *F16L 17/04* (2013.01); *F16L 21/08* (2013.01); *F16L 41/021* (2013.01); *F16L 43/00* (2013.01)

(58) Field of Classification Search
CPC . F16L 17/04; F16L 43/00; F16L 21/08; F16L 21/005; F16L 41/021
(Continued)

(56) References Cited

U.S. PATENT DOCUMENTS 1,203,989 A 11/1916 Dehn
1,287,108 A 12/1918 Robinson et al.
(Continued)

FOREIGN PATENT DOCUMENTS

CN 2473439 Y 1/2002
CN 101287942 A 10/2008
(Continued)

OTHER PUBLICATIONS

Lu, Li; English translation of Search Report from counterpart Chinese patent application No. 201480040440.8; dated Sep. 26, 2016, pp. 1-2, English translation prepared by China Patent Agent (H.K.) Ltd., Wanachi, Hong Kong.
(Continued)

*Primary Examiner* — Gregory John Binda
*Assistant Examiner* — Zachary T Dragicevich
(74) *Attorney, Agent, or Firm* — John A. Chionchio, Esquire; Ballard Spahr LLP

(57) ABSTRACT

Fittings, including elbow fittings and Tee fittings have bodies that surround a central space and define openings to receive pipe elements. Ribs surround the openings, and gaps are positioned between the ribs to permit deformation of the body when ends of the body in facing relation are brought together. The body may be formed of two housings or unitary in construction. The ribs may be grooved to accommodate toothed retainer rings providing mechanical engagement with pipe elements. The ribs have surfaces with radii of curvature that, when the ribs are undeformed, are substantially equal to the radii of curvature of the pipe elements they engage.

24 Claims, 15 Drawing Sheets

(51) Int. Cl.
*F16L 21/08* (2006.01)
*F16L 41/02* (2006.01)
*F16L 43/00* (2006.01)

(58) Field of Classification Search
USPC .............................. 285/340, 373, 419, 420
See application file for complete search history.

(56) References Cited

U.S. PATENT DOCUMENTS

| | | | |
|---|---|---|---|
| 1,379,811 A | 5/1921 | Fyffe | |
| 1,770,271 A | 7/1930 | Hoppes | |
| 1,831,641 A | 11/1931 | Skinner | |
| 1,969,043 A | 8/1934 | Sharp | |
| 1,999,045 A | 4/1935 | Goetz | |
| 2,094,258 A | 9/1937 | Thompson | |
| 2,128,720 A | 8/1938 | Tweedale | |
| 2,412,394 A | 12/1946 | Giles | |
| 2,463,235 A | 3/1949 | Andrews | |
| 2,958,546 A | 11/1960 | Lee | |
| 3,148,896 A | 9/1964 | Chu | |
| 3,153,550 A | 10/1964 | Hollett | |
| 3,362,730 A | 1/1968 | Clair et al. | |
| 3,466,069 A | 9/1969 | Hoke et al. | |
| 3,517,701 A | 6/1970 | Smith | |
| 3,596,935 A | 8/1971 | McGeoch, Sr. | |
| 3,633,943 A | 1/1972 | Ramm et al. | |
| 3,680,894 A | 8/1972 | Young | |
| 3,825,286 A | 7/1974 | Henry | |
| 3,920,270 A | 11/1975 | Babb, Jr. | |
| 3,944,260 A | 3/1976 | Petroczky | |
| 4,018,979 A | 4/1977 | Young | |
| 4,119,333 A * | 10/1978 | Straub | F16L 21/08 285/373 X |
| 4,181,329 A | 1/1980 | Helm | |
| 4,284,298 A | 8/1981 | Kaufmann, Jr. | |
| 4,461,498 A | 7/1984 | Kunsman | |
| 4,471,979 A | 11/1984 | Gibb et al. | |
| 4,611,839 A | 11/1986 | Rung et al. | |
| 4,629,217 A | 12/1986 | Straub | |
| 4,633,913 A | 1/1987 | Carty et al. | |
| 4,639,020 A | 1/1987 | Rung et al. | |
| 4,652,023 A | 3/1987 | Timmons | |
| 4,664,422 A | 5/1987 | Straub | |
| 4,678,208 A | 7/1987 | De Raymond | |
| 4,792,160 A | 12/1988 | Hwang | |
| 4,819,974 A | 4/1989 | Zeidler | |
| 4,838,584 A | 6/1989 | Dierksmeier | |
| 4,842,306 A | 6/1989 | Zeidler | |
| 4,861,075 A | 8/1989 | Pepi et al. | |
| 4,893,843 A | 1/1990 | De Raymond | |
| 4,896,902 A | 1/1990 | Weston | |
| 4,898,407 A * | 2/1990 | Zeidler | F16L 21/08 285/373 X |
| 5,018,768 A | 5/1991 | Palatchy | |
| 5,022,685 A | 6/1991 | Stiskin et al. | |
| 5,121,946 A | 6/1992 | Jardine | |
| 5,137,305 A | 8/1992 | Straub | |
| 5,161,836 A | 11/1992 | McKinnon | |
| 5,203,594 A * | 4/1993 | Straub | F16L 17/04 285/373 X |
| 5,230,537 A | 7/1993 | Newman | |
| 5,280,970 A | 1/1994 | Straub | |
| 5,452,922 A | 9/1995 | Ziu | |
| 5,603,530 A | 2/1997 | Guest | |
| 5,675,873 A | 10/1997 | Groess | |
| 5,758,907 A | 6/1998 | Dole et al. | |
| 5,772,257 A | 6/1998 | Webb | |
| 5,786,054 A | 7/1998 | Platusich et al. | |
| 5,961,154 A | 10/1999 | Williams et al. | |
| 6,276,726 B1 | 8/2001 | Daspit | |
| 6,302,450 B1 | 10/2001 | Dole et al. | |
| 6,305,719 B1 | 10/2001 | Smith, Jr. et al. | |
| 6,328,352 B1 * | 12/2001 | Geppert | F16L 21/08 285/373 X |
| 6,450,551 B1 | 9/2002 | Lee | |
| 6,505,865 B2 | 1/2003 | Minemyer | |
| 6,626,466 B1 | 11/2003 | Dole | |
| 6,749,232 B2 | 6/2004 | Wachter | |
| 7,070,209 B2 | 7/2006 | Collins | |
| 7,086,131 B2 | 8/2006 | Gibb et al. | |
| 7,500,699 B2 | 3/2009 | Snyder, Sr. et al. | |
| 7,523,963 B2 | 4/2009 | Draper et al. | |
| 7,644,960 B2 | 1/2010 | Casey, Sr. et al. | |
| 7,654,587 B2 | 2/2010 | Gibb et al. | |
| 7,712,796 B2 | 5/2010 | Gibb et al. | |
| 7,726,703 B2 | 6/2010 | Porter et al. | |
| 7,748,753 B2 | 7/2010 | Krausz | |
| 7,798,535 B2 | 9/2010 | Calhoun | |
| 7,861,982 B1 | 1/2011 | McClure | |
| 7,866,707 B2 | 1/2011 | Sudar | |
| 8,430,432 B2 | 4/2013 | Webb et al. | |
| 2003/0020276 A1 | 1/2003 | Steele | |
| 2005/0001428 A1 | 1/2005 | Scherrer | |
| 2005/0028366 A1 | 2/2005 | Bien et al. | |
| 2005/0082831 A1 | 4/2005 | Borland | |
| 2005/0253380 A1 | 11/2005 | Gibb et al. | |
| 2006/0214422 A1 | 9/2006 | Cuvo | |
| 2007/0296213 A1 | 12/2007 | Jones et al. | |
| 2008/0265568 A1 | 10/2008 | Bekkevold | |
| 2008/0272595 A1 | 11/2008 | Gibb et al. | |
| 2009/0160183 A1 | 6/2009 | Felber | |
| 2009/0172939 A1 | 7/2009 | Dole | |
| 2009/0206598 A1 | 8/2009 | Gibb et al. | |
| 2010/0115733 A1 | 5/2010 | Bouchiat et al. | |
| 2010/0320756 A1 | 12/2010 | Gibb et al. | |
| 2010/0320758 A1 | 12/2010 | Sisk | |
| 2011/0154646 A1 | 6/2011 | Hagiya | |
| 2011/0254268 A1 | 10/2011 | Johnson et al. | |
| 2012/0074689 A1 | 3/2012 | Petersen et al. | |
| 2013/0181446 A1 | 7/2013 | Le Clinche | |
| 2013/0327415 A1 | 12/2013 | Camp, Jr. et al. | |

FOREIGN PATENT DOCUMENTS

| | | |
|---|---|---|
| DE | 3443942 A1 | 6/1985 |
| DE | 3443943 A1 | 6/1985 |
| EP | 2113701 A1 | 4/2009 |
| FR | 2683017 | 4/1993 |
| FR | 2747453 A1 | 10/1997 |
| GB | 2098297 A | 11/1982 |
| GB | 2211255 | 12/1988 |
| JP | 52126317 | 3/1951 |
| JP | 2001304468 | 10/2001 |
| JP | 2002147664 | 5/2002 |
| JP | 2006250247 | 9/2006 |
| JP | 2007537414 | 12/2007 |
| TW | 522206 B | 3/2003 |
| WO | 9703811 A1 | 2/1997 |
| WO | 0046537 | 8/2000 |
| WO | 2005114023 | 12/2005 |
| WO | 2014179286 A1 | 11/2014 |

OTHER PUBLICATIONS

Lu, Li; English translation of first Office Action from counterpart Chinese patent application No. 201480040440.8; dated Sep. 26, 2016, pp. 1-9, English translation prepared by China Patent Agent (H.K.) Ltd., Wanachi, Hong Kong.

Dauvergne, Bertrans; European Search Report and Search Opinion from counterpart European patent application No. 14826083; Aug. 22, 2016, pp. 1-12, European Patent Office, Munich, Germany.

Copenheaver, Blain R.; International Search Report from corresponding International Patent Application No. PCT/US2014/046466; dated Nov. 7, 2014; pp. 1-2; United States Patent and Trademark Office as International Searching Authority; Alexandria, Virginia USA.

Copenheaver, Blain R.; Written Opinion of International Searching Authority from corresponding International Patent Application No. PCT/US2014/046466; dated Nov. 7, 2014; pp. 1-14; United States Patent and Trademark Office as International Searching Authority; Alexandria, Virginia USA.

(56) References Cited

OTHER PUBLICATIONS

Author Unknown; Search Report from counterpart Taiwan patent application No. 103124608, p. 1, dated Mar. 22, 2016.
Author Unknown; English translation of Search Report from counterpart Taiwan patent application No. 103124608, p. 1, dated Mar. 22, 2016; prepared by Lee and Li, Attorneys-at-Law, Taipei, Taiwan, R.O.C.
Author Unknown; Examiner's Report from counterpart Taiwan patent application No. 103124608, pp. 1-16; Mar. 22, 2016.
Author Unknown, English translation of Examiner's Report from counterpart Taiwan patent application No. 103124608, pp. 1-10, dated Mar. 22, 2016, prepared by Lee and Li, Attorneys-at-Law, Taipei, Taiwan, R.O.C.
Copenheaver, Blaine R.; International Search Report from related International Patent Application No. PCT/US2012/062148; dated Mar. 5, 2013; pp. 1-4; United States Patent and Trademark Office as International Search Authority; Alexandria, Virginia, USA.
Copenheaver, Blaine R.; Written Opinion from related International Patent Application No. PCT/US2012/062148; dated Mar. 5, 2013; pp. 1-10; United States Patent and Trademark Office as International Search Authority; Alexandria, Virginia, USA.
Copenheaver, Blaine R.; International Search Report from related International Patent Application No. PCT/US2012/065793; dated Apr. 23, 2013; pp. 1-4; United States Patent and Trademark Office as International Search Authority; Alexandria, Virginia, USA.
Copenheaver, Blaine R.; Written Opinion from related International Patent Application No. PCT/US2012/065793; dated Apr. 23, 2013; pp. 1-5; United States Patent and Trademark Office as International Search Authority; Alexandria, Virginia, USA.
Young, Lee W.; International Search Report from related International Patent Application No. PCT/US2013/021384; dated Jun. 11, 2013; pp. 1-2; United States Patent and Trademark Office as International Search Authority; Alexandria, Virginia, USA.
Young, Lee W.; Written Opinion from related International Patent Application No. PCT/US2013/021384; dated Jun. 11, 2013; pp. 1-8; United States Patent and Trademark Office as International Search Authority; Alexandria, Virginia, USA.

\* cited by examiner

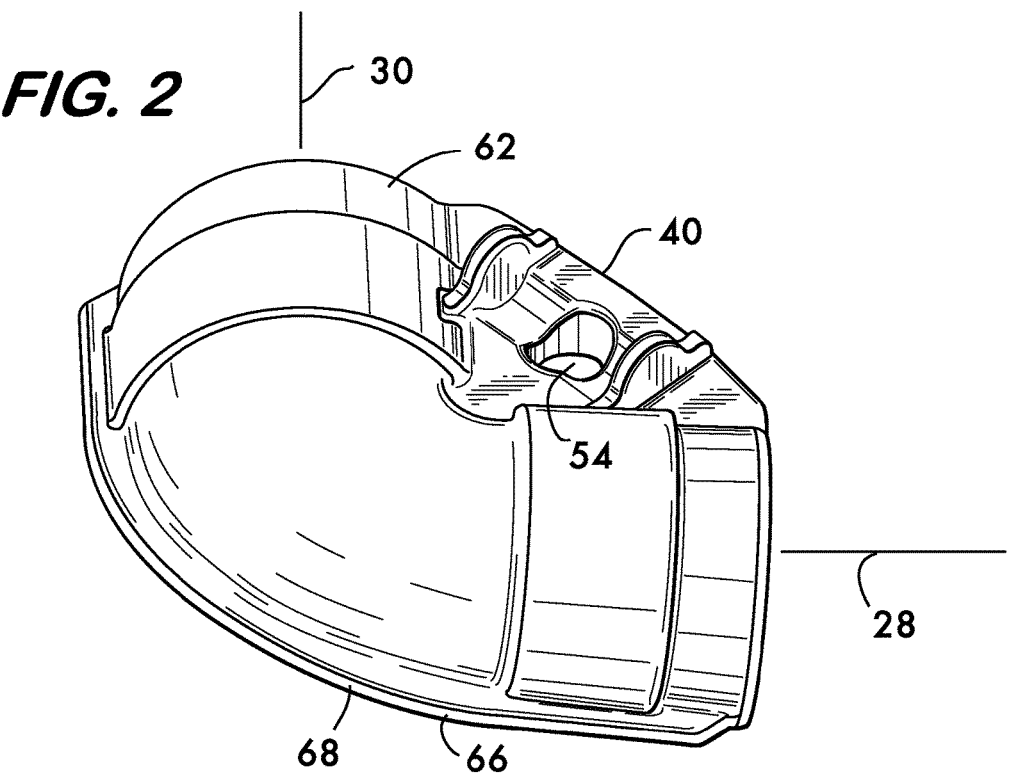
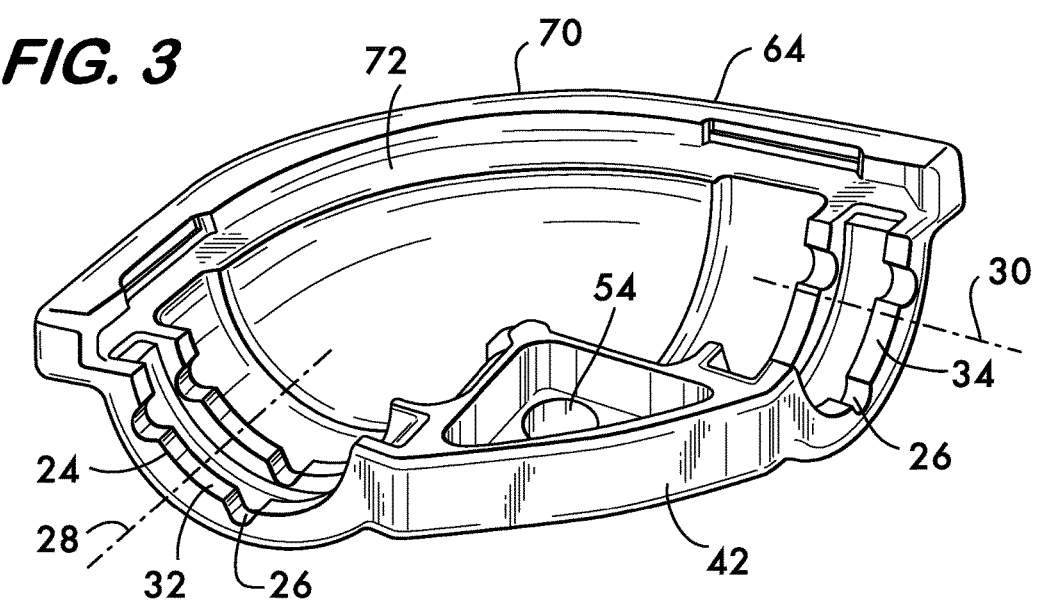

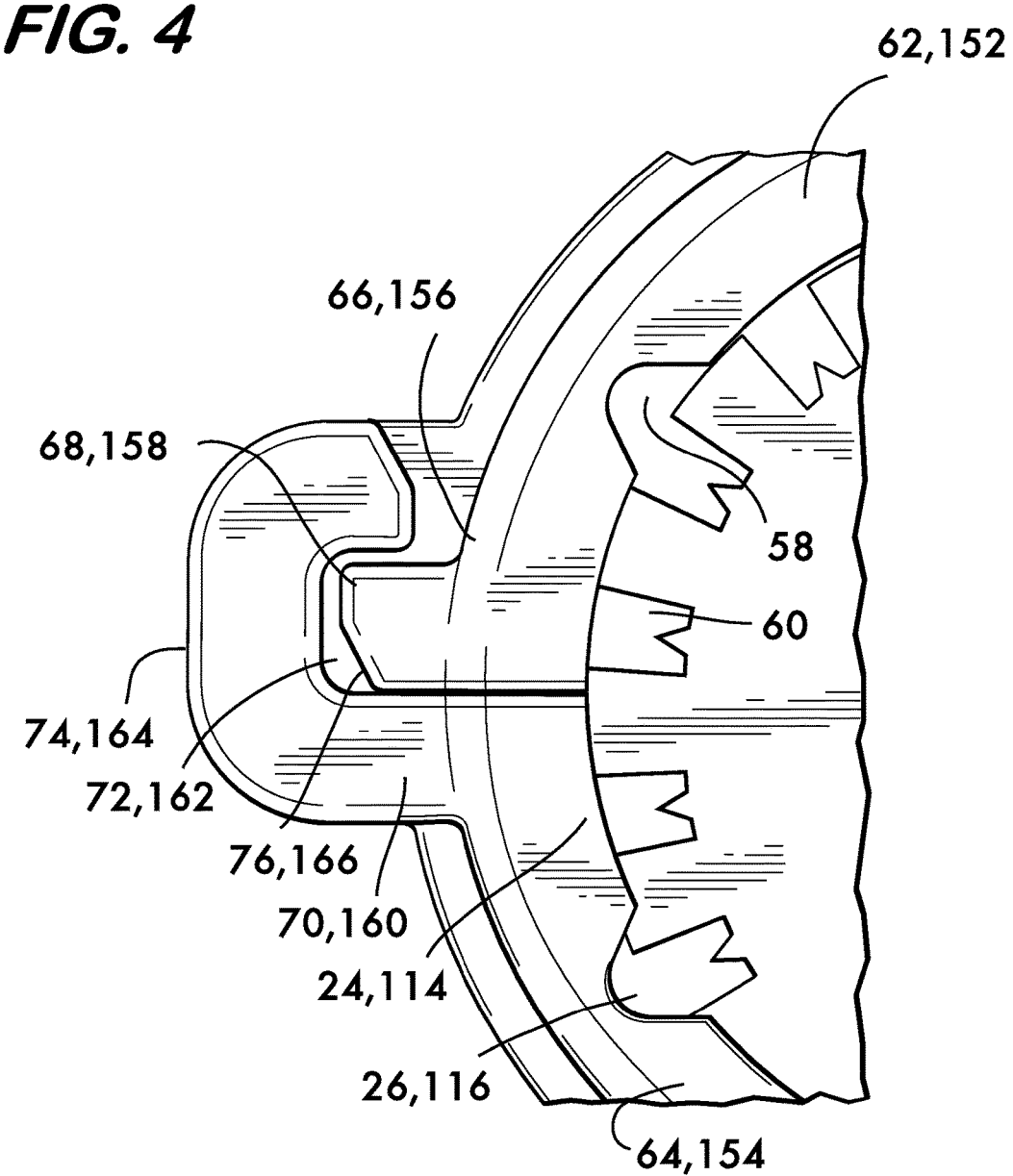

FITTINGS HAVING ARCUATE STIFFNESS RIBS

CROSS REFERENCE TO RELATED APPLICATIONS

This application is based upon and claims priority to U.S. Provisional Application No. 61/847,354, filed Jul. 17, 2013, and to U.S. Provisional Application No. 61/847,356, filed Jul. 17, 2013, both provisional applications being hereby incorporated by reference herein.

FIELD OF THE INVENTION

This invention relates to fittings for joining pipe elements in end to end relation.

BACKGROUND

"Straub" type couplings are formed of a unitary band having free ends which are subjected to tangential tension force that clamps the band around pipe elements to be joined end to end. Under the tension force, the band deforms radially inwardly to encompass a smaller diameter and force toothed retainer rings captured between the band and the pipe elements into engagement with the pipe elements. Deformation of the band also compresses a gasket against the pipe elements to ensure a fluid-tight joint. Examples of Straub type couplings are disclosed in U.S. Pat. Nos. 4,629, 217, 4,664,422, 5,137,305 and 5,280,970.

Joints formed by Straub type couplings are often flexible in bending. While bending flexibility is sometimes desired in piping networks, for those situations when more rigidity in bending is needed, Straub type couplings are inappropriate. There is clearly a need for a fitting which combines the advantages of the Straub type coupling with the increased bending stiffness normally associated with other types of mechanical couplings, such as segmented mechanical couplings as disclosed in U.S. Pat. No. 4,611,839. It is further desirable to develop fittings in this family that can be used to join pipes that are not collinear with one another, as well as fittings that can join more than two pipe elements to one another.

SUMMARY

The invention concerns a fitting for joining pipe elements together. In one example embodiment, the fitting comprises a body surrounding a central space for receiving the pipe elements. The body defines first and second openings respectively positioned on first and second sides of the body for receiving the pipe elements. The body has a plurality of first arcuate ribs positioned end to end surrounding the first opening. A gap is positioned between adjacent pairs of the first arcuate ribs. Each of the first arcuate ribs projects toward a first axis oriented coaxially with the first opening. Each of the first arcuate ribs has a surface facing the first axis. The surfaces on each of the first arcuate ribs have a radius of curvature substantially equal to a radius of curvature of an outer surface of the pipe elements when the first arcuate ribs are in an undeformed state. The body has a plurality of second arcuate ribs positioned end to end surrounding the second opening. A gap is positioned between adjacent pairs of the second arcuate ribs. Each of the second arcuate ribs projects toward a second axis oriented coaxially with the second opening. Each of the second arcuate ribs has a surface facing the second axis. The surfaces on each of the second arcuate ribs has a radius of curvature substantially equal to a radius of curvature of an outer surface of the pipe elements when the second arcuate ribs are in an undeformed state. In this example, the first axis is angularly oriented with respect to the second axis. The body further has first and second ends positioned in facing relation and connection members positioned on the first and second ends. The connection members are adjustably tightenable for drawing the first and second ends toward one another. The body is deformable in the gaps between each of the first and second arcuate ribs to allow the first and second ends to move toward one another upon adjustable tightening of the connection members. The surfaces on each of the first and second arcuate ribs are thereby brought into engagement with the outer surfaces of the pipe elements while in the undeformed state.

In a particular example embodiment, the body is a unitary body. By way of example, the fitting may have five arcuate ribs and four gaps surrounding each of the first and second openings. In an example, the gaps are asymmetrically positioned about the openings. In a further example, at least one of the ribs has a length less than another of the ribs. Additionally by way of example, the surfaces of each of the arcuate ribs may be substantially flat. In another example, the surfaces of each of the arcuate ribs have a knife edge shape.

In another example embodiment, the body comprises a first housing including the first end of the body, and a second housing, separate from the first housing. The second housing includes the second end of the body. The first housing has a third end positioned opposite to the first end. The second housing has a fourth end positioned opposite to the second end. A joint attaches the third and fourth ends to one another. By way of example, the joint may comprise a channel extending along at least a portion of the fourth end of the second housing and a projection extending along at least a portion of the third end of the first housing. The projection interfits within the channel.

In a particular example, each of the first and second housings comprises three of the arcuate ribs and two of the gaps on each side thereof. By way of further example, the gaps may be asymmetrically positioned about the openings. In a specific example, at least one of the ribs has a length less than another of the ribs.

The example embodiment may further comprise a gasket positioned within the central space between the sides. The gasket surrounds the central space and is engageable with the pipe elements for sealingly joining the pipe elements.

In a specific example, the connection members comprise a pair of projections, one the projection being positioned on each of the first and second ends of the body. The projections have holes to receive a fastener, the fastener being adjustably tightenable for drawing the first and second ends toward one another. By way of example, the fastener may comprise a bolt and a nut.

Another example embodiment further comprises a first groove extending lengthwise along the plurality of first arcuate ribs, the first groove facing the first axis. In this example, a first ring may be positioned within the first groove and surround the first opening. The first ring has a plurality of teeth projecting toward the first axis. In an example, the first ring may comprise at least two arcuate sections.

Further by way of example, a second groove extends lengthwise along the plurality of second arcuate ribs, the second groove facing the second axis. A second ring may be positioned within the second groove, the second ring having a plurality of teeth projecting toward the second axis.

An example embodiment may further comprise a second groove extending lengthwise along the plurality of second arcuate ribs. The second groove faces the second axis. A second ring may be positioned within the second groove, the second ring having a plurality of teeth projecting toward the second axis. By way of example, the first axis is oriented to the second axis at an angle of about 90°.

The invention also encompasses a method of joining pipe elements. In an example embodiment, the method comprises:

inserting the pipe elements into a central space defined by a body having first and second ends in facing relation and a plurality of arcuate ribs positioned end to end along opposite sides of the body, each of the ribs having a surface with a radius of curvature substantially equal to a radius of curvature of an outer surface of the pipe elements;

drawing the first and second ends toward one another thereby deforming the body at a plurality of gaps between the plurality of ribs so as to engage the surfaces of the ribs with the outer surfaces of the pipe elements.

The method, by way of example, may further comprise compressing a split ring positioned within the central space and adjacent to the ribs along one of the sides of the body. The split ring has a plurality of teeth, the teeth being forced into engagement with one of the pipe elements.

In another example embodiment of a fitting for joining pipe elements together, the fitting comprises a body surrounding a central space for receiving the pipe elements. The body defines first and second openings respectively positioned on first and second sides of the body for receiving the pipe elements. The body has a plurality of first arcuate ribs positioned end to end surrounding the first opening. A gap is positioned between adjacent pairs of the first arcuate ribs. Each of the first arcuate ribs projects toward a first axis oriented coaxially with the first opening. Each of the first arcuate ribs has a surface facing the first axis. The surfaces on each of the first arcuate ribs has a radius of curvature substantially equal to a radius of curvature of an outer surface of the pipe elements when the first arcuate ribs are in an undeformed state. The body further has a plurality of second arcuate ribs positioned end to end surrounding the second opening. A gap is positioned between adjacent pairs of the second arcuate ribs. Each of the second arcuate ribs projects toward a second axis oriented coaxially with the second opening. Each of the second arcuate ribs has a surface facing the second axis. The surfaces on each of the second arcuate ribs has a radius of curvature substantially equal to a radius of curvature of an outer surface of the pipe elements when the second arcuate ribs are in an undeformed state. The body further has first and second ends positioned in facing relation. The first and second ends define a third opening for receiving the pipe elements. A third arcuate rib is positioned on each of the first and second ends surrounding the third opening. The third arcuate ribs project toward a third axis oriented coaxially with the third opening. Each of the third arcuate ribs has a radius of curvature substantially equal to a radius of curvature of an outer surface of the pipe elements when the third arcuate ribs are in an undeformed state. By way of example, the third axis may be angularly oriented with respect to one of the first and second axes. By way of example the body further comprises connection members positioned on the first and second ends. The connection members are adjustably tightenable for drawing the first and second ends toward one another. The body is deformable in the gaps between each of the first and second arcuate ribs to allow the first and second ends to move toward one another upon adjustable tightening of the connection members. The surfaces on each of the first, second and third arcuate ribs thereby are brought into respective engagement with the outer surfaces of the first, second and third pipe elements while in the undeformed state.

In a particular example embodiment, the body is a unitary body. By way of further example, the body may comprise five arcuate ribs and four gaps surrounding each of the first and second openings. As an example, the gaps may be asymmetrically positioned about the openings. In a further example, at least one of the ribs has a length less than another of the ribs. In another example, the surfaces of each of the arcuate ribs are substantially flat. By way of a further example, the surfaces of each of the arcuate ribs may have a knife edge shape.

In an example fitting embodiment, the body comprises a first housing including the first end of the body and a second housing, separate from the first housing. The second housing includes the second end of the body. The first housing has a third end positioned opposite to the first end. The second housing has a fourth end positioned opposite to the second end. A joint attaches the third and fourth ends to one another.

In a particular example embodiment, the joint comprises a channel extending along at least a portion of the fourth end of the second housing. A projection extends along at least a portion of the third end of the first housing, the projection interfitting within the channel. By way of example, each of the first and second housings may comprise three arcuate ribs and two gaps on each side thereof. In an example, the gaps may be asymmetrically positioned about the openings. Further by way of example, at least one of the ribs has a length less than another of the ribs.

An example fitting may further comprise a gasket positioned within the central space between the sides. The gasket surrounds the central space and is engageable with the pipe elements for sealingly joining the pipe elements.

By way of example, the connection members may comprise two pair of projections. The projections are positioned on each of the first and second ends of the body on opposite sides of the third opening. The projections have holes to receive respective fasteners, the fasteners being adjustably tightenable for drawing the first and second ends toward one another. In an example, the fasteners comprise bolts and nuts.

By way of example, the fitting may further comprise a first groove extending lengthwise along the plurality of first arcuate ribs, the first groove facing the first axis. A first ring may be positioned within the first groove surrounding the first opening. The first ring has a plurality of teeth projecting toward the first axis. In a particular example, the first ring comprises at least two arcuate sections. In another example, the fitting comprises a second groove extending lengthwise along the plurality of second arcuate ribs. The second groove faces the second axis and a second ring may be positioned within the second groove. The second ring has a plurality of teeth projecting toward the second axis. The fitting, by way of example may further comprise a third groove extending lengthwise along the third arcuate ribs. The third groove faces the third axis and a third ring may be positioned within the third groove. The third ring has a plurality of teeth projecting toward the third axis. Any of the rings may comprise at least two arcuate sections by way of example.

In a particular example of a fitting according to the invention, the third axis may be oriented relatively to the first axis at an angle of about 90°.

The invention further encompasses, in combination, a pair of pipe elements and a fitting for joining the pipe elements together. In a particular example embodiment, the fitting comprises a body surrounding a central space for receiving the pipe elements. The body defines first and second openings respectively positioned on first and second sides of the body for receiving the pipe elements. The body has a plurality of first arcuate ribs positioned end to end surrounding the first opening. A gap is positioned between adjacent pairs of the first arcuate ribs. Each of the first arcuate ribs projects toward a first axis oriented coaxially with the first opening. Each of the first arcuate ribs has a surface facing the first axis. The surfaces on each of the first arcuate ribs have a radius of curvature substantially equal to a radius of curvature of an outer surface of the pipe elements when the first arcuate ribs are in an undeformed state. The body has a plurality of second arcuate ribs positioned end to end surrounding the second opening. A gap is positioned between adjacent pairs of the second arcuate ribs. Each of the second arcuate ribs projects toward a second axis oriented coaxially with the second opening. Each of the second arcuate ribs has a surface facing the second axis. The surfaces on each of the second arcuate ribs havings a radius of curvature substantially equal to a radius of curvature of an outer surface of the pipe elements when the second arcuate ribs are in an undeformed state. In this example, the first axis is angularly oriented with respect to the second axis. The body further has first and second ends positioned in facing relation and connection members positioned on the first and second ends. The connection members are adjustably tightenable for drawing the first and second ends toward one another. The body is deformable in the gaps between each of the first and second arcuate ribs to allow the first and second ends to move toward one another upon adjustable tightening of the connection members. Upon tightening, the surfaces on each of the first and second arcuate ribs are thereby brought into engagement with the outer surfaces of the pipe elements while in the undeformed state. In a specific example combination, at least one of the pipe elements has a circumferential groove. One of the first and second arcuate ribs engages the outer surface of the at least one pipe element within the circumferential groove.

A further example combination comprises three pipe elements and a fitting for joining the pipe elements together. In a particular example embodiment the fitting comprises a body surrounding a central space for receiving the pipe elements. The body defines first and second openings respectively positioned on first and second sides of the body for receiving a first and a second one of the pipe elements. The body has a plurality of first arcuate ribs positioned end to end surrounding the first opening. A gap is positioned between adjacent pairs of the first arcuate ribs. Each of the first arcuate ribs projects toward a first axis oriented coaxially with the first opening. Each of the first arcuate ribs has a surface facing the first axis. The surfaces on each of the first arcuate ribs has a radius of curvature substantially equal to a radius of curvature of an outer surface of the first pipe element when the first arcuate ribs are in an undeformed state. The body has a plurality of second arcuate ribs positioned end to end surrounding the second opening. A gap is positioned between adjacent pairs of the second arcuate ribs. Each of the second arcuate ribs projects toward a second axis oriented coaxially with the second opening. Each of the second arcuate ribs has a surface facing the second axis. The surfaces on each of the second arcuate ribs has a radius of curvature substantially equal to a radius of curvature of an outer surface of the second pipe element when the second arcuate ribs are in an undeformed state. The body further has first and second ends positioned in facing relation. The first and second ends define a third opening for receiving the third pipe element. A third arcuate rib is positioned on each of the first and second ends surrounding the third opening. The third arcuate ribs project toward a third axis oriented coaxially with the third opening. Each of the third arcuate ribs has a radius of curvature substantially equal to a radius of curvature of an outer surface of the third pipe element when the third arcuate ribs are in an undeformed state. The third axis is angularly oriented with respect to at least one of the first and second axes. The body further comprises connection members positioned on the first and second ends. The connection members are adjustably tightenable for drawing the first and second ends toward one another. The body is deformable in the gaps between each of the first and second arcuate ribs and allowing the first and second ends to move toward one another upon adjustable tightening of the connection members. Upon tightening, the surfaces on each of the first, second and third arcuate ribs are thereby brought into respective engagement with the outer surfaces of the first, second and third pipe elements while in the undeformed state. In a particular example, at least one of the pipe elements has a circumferential groove, one of the first, second and third arcuate ribs engaging the outer surface of the at least one pipe element within the circumferential groove.

BRIEF DESCRIPTION OF THE DRAWINGS

FIG. 2 is an isometric view of a component of the fitting shown in FIG. 1;

FIG. 3 is an isometric view of a component of the fitting shown in FIG. 1;

FIG. 4 is a sectional view taken at line 4-4 of FIG. 1;

DETAILED DESCRIPTION

Figures 1, 1A:
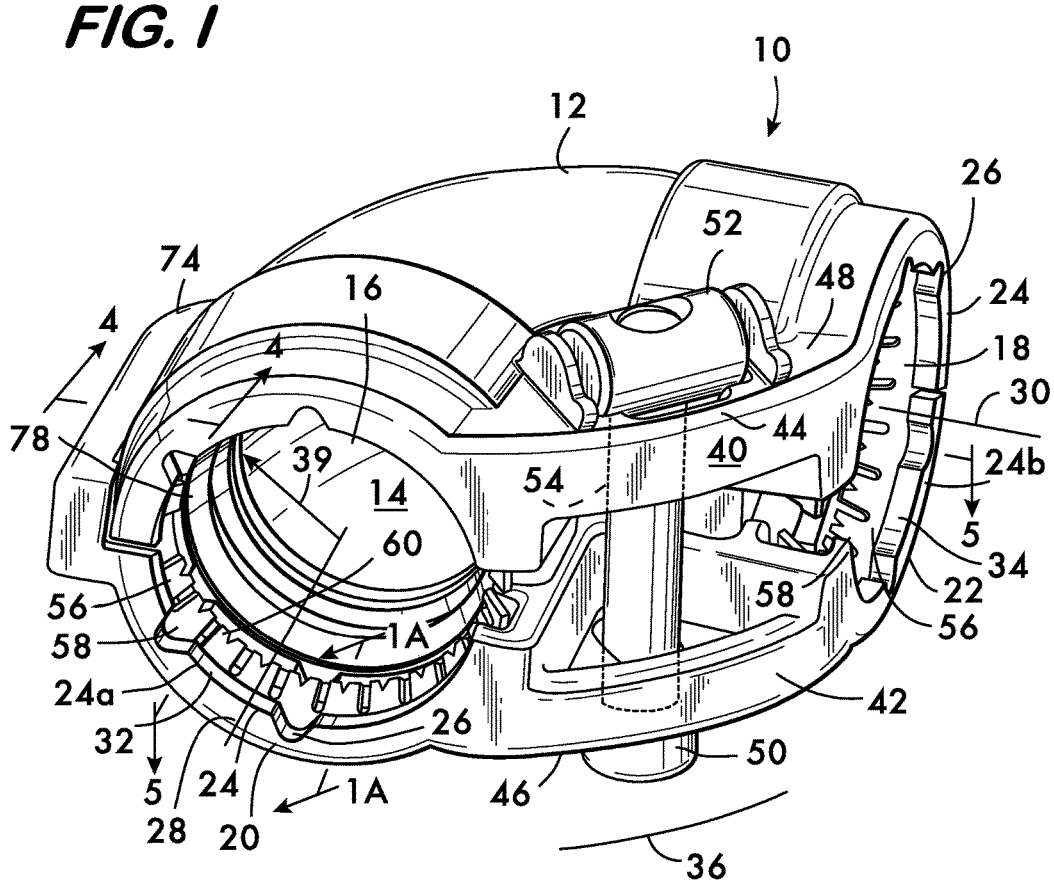
FIG. 1 is an isometric view of an example elbow fitting according to the invention.
FIG. 1A is a sectional view taken at line 1A-1A of FIG. 1.

FIG. 1 shows a fitting, in this example, an elbow fitting 10 according to the invention. Elbow fitting 10 comprises a body 12 surrounding a central space 14 for receiving pipe elements (not shown). Body 12 defines first and second openings 16 and 18 positioned on respective first and second sides 20 and 22 of the fitting 10 and providing access to the central space 14. A plurality of ribs 24 are positioned on body 12 surrounding the openings 16 and 18. The ribs 24 are arcuate and are separated from one another by gaps 26 positioned between adjacent pairs of ribs. Ribs 24a surrounding opening 16 project toward a first axis 28 oriented coaxially with the opening 16, and ribs 24b surrounding opening 18 project toward a second axis 30 oriented coaxially with the opening 18. Each rib 24a has a surface 32 that faces the first axis 28, and each rib 24b has a surface 34 that faces the second axis 30. For the elbow fitting 10 the axes 28 and 30 are oriented angularly relatively to one another, in this example at an angle 36 of about 90°, it being understood that other orientation angles are feasible. Surfaces 32 and 34 may be substantially flat as shown in FIG. 1, or may have a knife edge 38 as shown in FIG. 1A. Other shapes for the surfaces, such as a radiused or rounded shape, are also feasible.

Body 12 also comprises first and second ends 40 and 42 positioned in facing relation with one another. First and second connection members 44 and 46 are respectively mounted on the first and second ends 40 and 42. In this example, the connection members comprise projections 48 that are adjustably tightenable so as to move ends 40 and 42 toward one another when the fitting is used to form a joint. Adjustable tightening of the connection members is effected using fasteners, in this example comprising bolt 50 and a nut 52 that extend through holes 54 in each projection 48.

Surfaces 32 and 34 on each rib 24a and 24b have radii of curvature 39 that, when the ribs are in an undeformed state, are substantially equal to the radius of curvature of the outer surface of the pipe elements that are being joined by the fitting 10. This condition on the radii 39 marks a significant departure from Straub type couplings, wherein the portion of the coupling that interfaces with the pipe elements has a larger radius of curvature than the outer surface of the pipe elements when the coupling is undeformed. To effect the joint, the Straub type coupling deforms substantially along its entire circumference when tightened, thereby reducing the fitting's radius of curvature. In contrast, body 12 is deformable primarily at the gaps 26 between each of the ribs 24, the ribs themselves undergoing no significant deformation due to their relatively high stiffness as compared with the stiffness of body 12 in the regions of gaps 26. Thus as the bolt 50 is tightened to draw the ends 40 and 42 toward one another, the body 12 deforms at the gaps 26 to permit the surfaces 32, 34 of the arcuate ribs 24 to engage the outer surfaces of the pipe elements being joined to effect mechanical engagement. Having substantially the same radius of curvature as the pipe elements, the surfaces 32, 34 of the ribs 24 engage the outer surface of the pipe elements substantially continuously without significant deformation with improved bending stiffness as compared with Straub type couplings.

To further augment the bending stiffness of the joint formed using the fitting 10 according to the invention, the ribs 24 may be split by a groove 56. Grooves 56 may extend lengthwise along each the ribs 24, the grooves facing the first and second axes 28 and 30 of their respective openings 16 and 18. The grooves 56 may be described as splitting the ribs in two lengthwise and thereby providing a wider footprint of engagement with the outer surfaces of the pipe elements, thereby increasing the bending stiffness of the joint. Grooves 56 also provide a region for the addition of retainer rings 58. Retainer rings 58 are confined within the grooves 56 and have a plurality of teeth 60 that project toward the axes 28 and 30 of their respective openings 16 and 18. The teeth 60 bite into plain end pipe and increase the mechanical engagement between the fitting 10 and the pipe elements and better resist axial forces that would otherwise separate the pipe elements from the fitting. It is advantageous for rings 58 to comprise two arcuate sections (which may or may not be semi-circular). Rings 58 may also be split rings which have a gap allowing them to deform into a smaller diameter as the ends 40 and 42 are drawn toward one another. Split rings are advantageous because they grip plain end pipe elements effectively but do not significantly resist the closing of the fitting as the ends 40 and 42 are brought together.

Figure 1B:
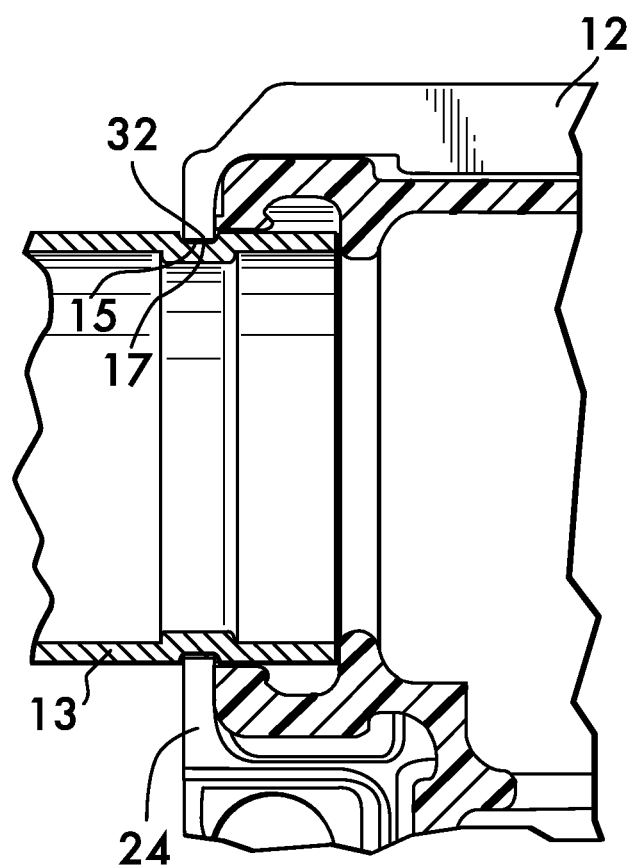
FIG. 1B is a sectional view of a portion of an example fitting embodiment according to the invention.

Example fittings according to the invention may also be used with other types of pipe elements, such as grooved pipe elements 13 shown in FIG. 1B. Circumferential grooves 15 receive the ribs 24 which engage the outer surface of the pipe elements 13 within the grooves 15, the arcuate surface 32 engaging the floor 17 of the groove in a particular example embodiment.

Figure 5:
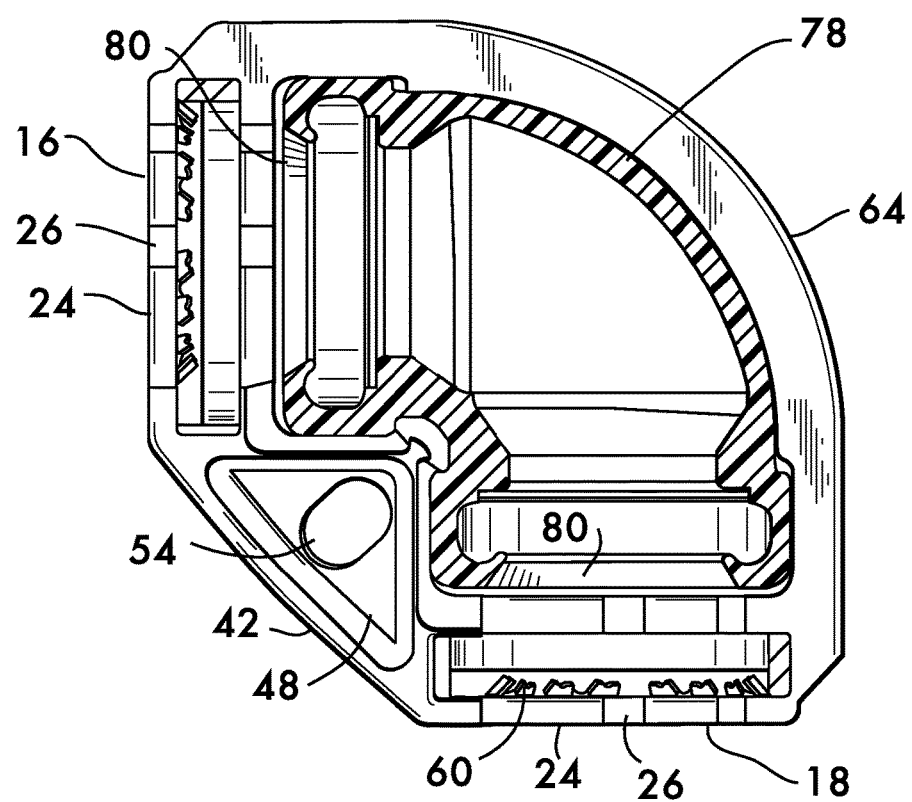
FIG. 5 is a sectional view taken at line 5-5 of FIG. 1.

The fitting according to the invention may have several practical embodiments. Example fitting 10, as shown in FIG. 1, has a body 12 comprising two separate housings 62 and 64, shown in detail in FIGS. 2 and 3. First housing 62 (FIG. 2) includes the first end 40 of body 12. The end 66 of housing 62 opposite end 40 comprises a projection 68 that extends along the end 66 of the housing 62. Second housing 64 (FIG. 3) includes the second end 42 of the body 12 and, at its end 70 opposite end 42, includes a channel 72. Channel 72 extends along end 70 of second housing 64 and cooperates with the projection 68 to form a joint 74, shown in FIG. 1 and in detail in FIG. 4. Joint 74 retains the housings 62 and 64 to one another. As shown in FIG. 4, channel 72 receives the projection 68, the projection having a chamfered edge 76 to aid its insertion into position within the channel 72 when the housings 62 and 64 are assembled to form the body 12. The joint 74 permits the housings to be located in spaced apart relation sufficient to insert pipe elements through the openings 16 and 18 and into the central space 14. As shown in FIG. 5, a gasket 78 is captured between housings 62 and 64. Gasket 78 may be made of resilient, elastic material, for example, rubber compounds, and extends between the first and second openings 16 and 18 of the body 12. The gasket 78 has conical inner surfaces 80 that effect a fluid tight seal between the gasket 78 and the pipe elements to form a fluid-tight joint. The fluid tight joint between the pipes and the fitting 10 is effected once the pipe elements are inserted and the first and second ends 40 and 42 are drawn toward one another by adjustable tightening of the connection members 44 and 46, for example, via bolt 50. The gasket 78 is thereby compressed, effecting the seal between the pipes and the body 12. During tightening of the connection members 44 and 46 the housings 62 and 64 deform primarily at the gaps 26 between the ribs 24 to accommodate the pipe elements being joined by the fitting 10. In the example fitting shown in FIG. 1, there are three ribs 24 separated by two gaps on each housing 62 and 64. Note that the gaps 26 are not necessarily positioned symmetrically about the openings 16 and 18, nor does each rib 24 necessarily have the same length, some ribs being shorter than others. The lengths of the ribs 24 and the positioning of the gaps 26 are variables of the design used to control the deformation of the housings to ensure a fluid tight joint. In this example, the asymmetrical positioning of gaps 26 coupled with shorter ribs 24 positioned near the joint 74 concentrate the deformation of the housings 62 and 64 in the portion of the body 12 proximate to the joint. Other designs, both symmetric and asymmetric, with ribs of equal and unequal length, are of course feasible.

Figure 6:
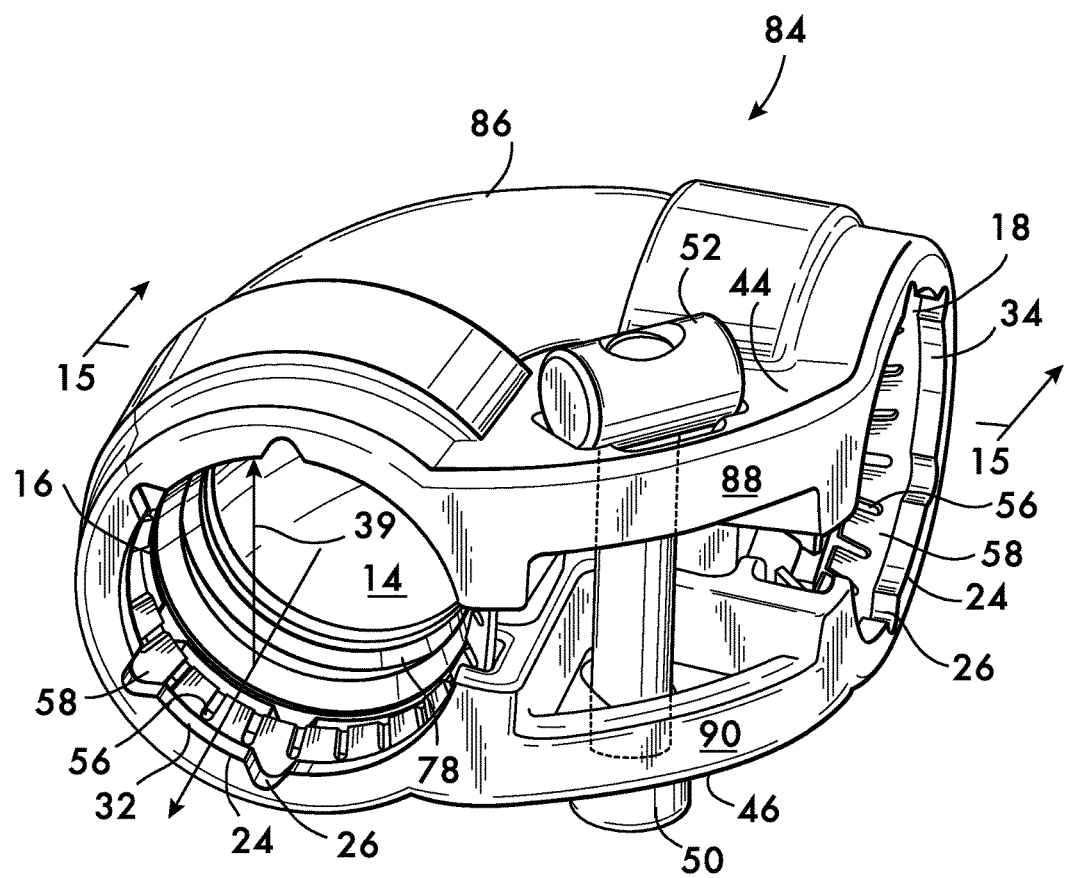
FIG. 6 is an isometric view of another example embodiment of an elbow fitting according to the invention.

FIG. 6 illustrates another fitting embodiment 84. Fitting 84 comprises a unitary body 86 surrounding the central space 14 that receives the pipe elements. Similarly to the fitting 10 described above, a plurality of arcuate ribs 24 surround the openings 16 and 18 defined by the body 86. The unitary body 86 deforms primarily at the gaps 26 between the ribs 24, and the surfaces 32, 34 of the ribs 24 have radii of curvature 39 substantially equal to the pipe elements being joined by the fitting 84 when the ribs are in an undeformed state. In this embodiment, ribs 24 may have grooves 56 in which toothed retaining rings 58 may be positioned. Adjustably tightenable connection members 44 and 46 are positioned at first and second ends 88 and 90, and a fastener, such as the bolt 50 and nut 52 may be used to effect the adjustable tightening and draw the ends 88 and 90 toward one another to effect a pipe joint. Fluid tight sealing is provided by a gasket 78 as described above. Example fitting 84 has five ribs 24 separated by four gaps 26 surrounding openings 16 and 18 on each side of the body 86. Again, the gaps 26 are asymmetrically distributed about the openings 16 and 18, and the ribs are not all the same length. Other designs are of course feasible.

Figure 7:
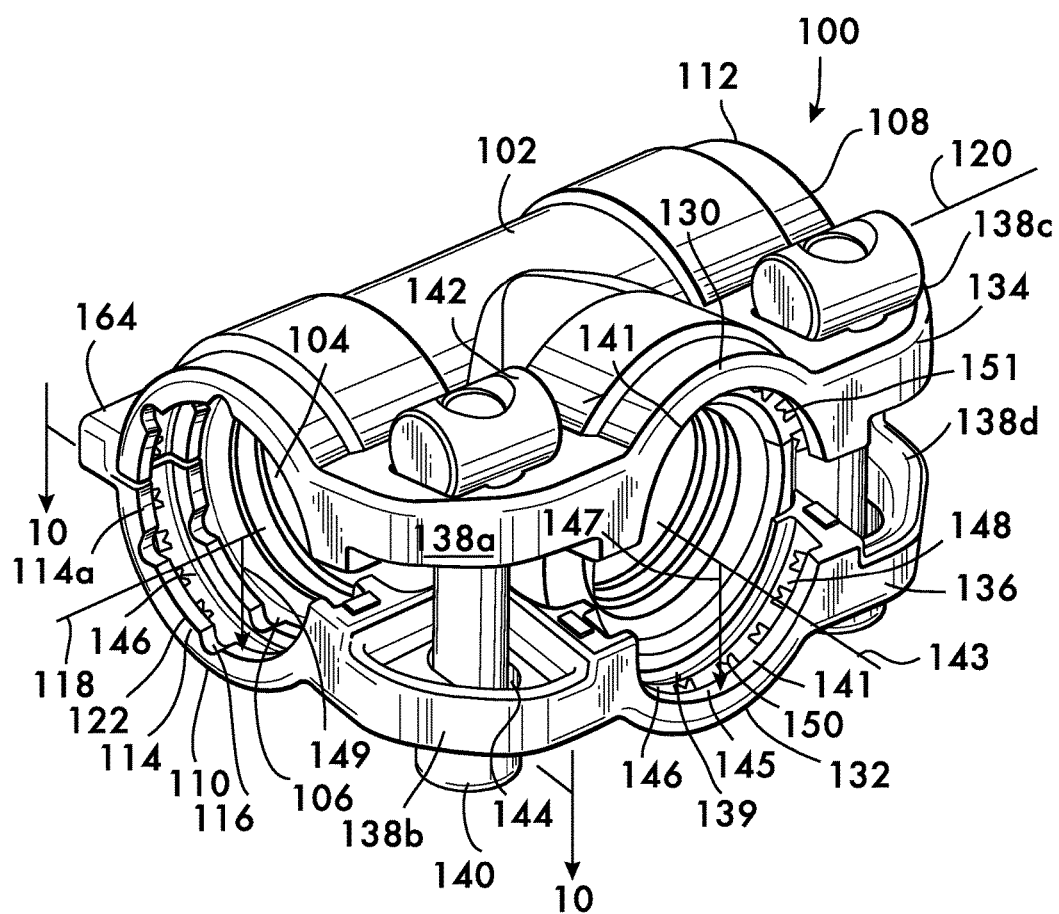
FIG. 7 is an isometric view of an example Tee fitting according to the invention.
Figure 9:
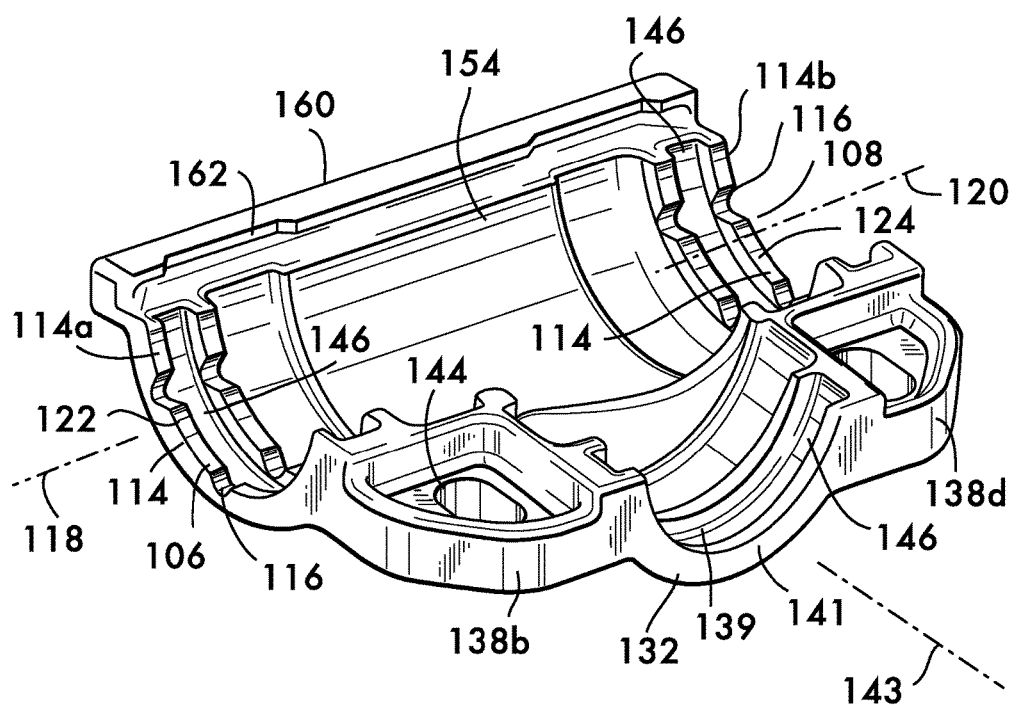
FIG. 9 is an isometric view of a component of the fitting shown in FIG. 7.

FIG. 7 shows another fitting embodiment, in this example, a "Tee" fitting 100 according to the invention. Tee fitting 100 comprises a body 102 surrounding a central space 104 for receiving pipe elements (not shown). Body 102 defines first and second openings 106 and 108 positioned on respective first and second sides 110 and 112 of the fitting 100 and providing access to the central space 104. A plurality of ribs 114 are positioned on body 102 surrounding the openings 106 and 108. The ribs 114 are arcuate and are separated from one another by gaps 116 positioned between adjacent pairs of ribs. Ribs 114a surrounding opening 106 project toward a first axis 118 oriented coaxially with the opening 106, and ribs 114b (see FIG. 9) surrounding opening 108 project toward a second axis 120 oriented coaxially with the opening 108. Each rib 114a has a surface 122 that faces the first axis 118, and each rib 114b has a surface 124 that faces the second axis 120. For the example Tee fitting 100 the axes 118 and 120 are aligned with one another, it being understood that other orientation angles are feasible. Surfaces 122 and 124 may be substantially flat as shown in FIG. 7, or may have a knife edge 128 as shown in FIG. 1A. Other shapes for the surfaces, such as a radiused or rounded shape, are also feasible.

Body 102 also comprises first and second ends 130 and 132 positioned in facing relation with one another. First and second connection members 134 and 136 are respectively mounted on the first and second ends 130 and 132. In this example, the connection members comprise two pairs of projections 138a, 138b, and 138c and 138d that are adjustably tightenable so as to move ends 130 and 132 toward one another when the fitting is used to form a joint. Adjustable tightening of the connection members is effected using fasteners, in this example comprising bolts 140 and nuts 142 that extend through holes 144 in each projection pair 138a and 138b, and 138c and 138d.

Connection member pairs 138a and 138b and 138c and 138d are positioned on opposite sides of a third opening 139 defined by the ends 130 and 132 for receiving a pipe element. Arcuate ribs 141 are positioned on each end 130 and 132 surrounding opening 139. Arcuate ribs 141 project toward a third axis 143 oriented coaxially with the third opening 139. Each arcuate rib 141 has surface 145 with a radius of curvature 147 substantially equal to the radius of curvature of the outer surface of the pipe element received in the opening 139 when the ribs 141 are in an undeformed state. Axis 143 is oriented angularly with respect to one or both of the first and second axes 118 and 120, in this example the orientation angle being 90°, although other orientation angles are of course feasible.

Surfaces 122 and 124 on each rib 114a and 114b have radii of curvature 149 that, when the ribs are in an undeformed state, are substantially equal to the radius of curvature of the outer surface of the pipe elements that are being joined by the Tee fitting 100. This condition on the radii 149 marks a significant departure from Straub type couplings, wherein the portion of the coupling that interfaces with the pipe elements has a larger radius of curvature than the outer surface of the pipe elements when the coupling is undeformed. To effect the joint, the Straub type coupling deforms substantially along its entire circumference when tightened, thereby reducing the fitting's radius of curvature. In contrast, body 102 is deformable primarily at the gaps 116 between each of the ribs 114, the ribs themselves undergoing no significant deformation due to their relatively high stiffness as compared with the stiffness of body 102 in the regions of gaps 116. Thus as the bolts 140 are tightened to draw the ends 130 and 132 toward one another the body 102 deforms at the gaps 116 to permit the surfaces 122, 124 of the arcuate ribs 114 to engage the outer surfaces of the pipe elements being joined to effect mechanical engagement. Having substantially the same radius of curvature as the pipe elements, the surfaces 122, 124 of the ribs 114 engage the outer surface of the pipe elements substantially continuously without significant deformation and provide improved bending stiffness as compared with Straub type couplings. In a similar manner, the ribs 141 surrounding the third opening 139 engage the outer surface of the pipe element as the ends 130 and 132 of body 102 are brought toward one another.

To further augment the bending stiffness of the joint formed using the Tee fitting 100 according to the invention, the ribs 114 surrounding the first and second openings 106 and 108 and ribs 141 surrounding the third opening 139 may be split by a groove 146. Grooves 146 may extend lengthwise along each the ribs 114, 141, the grooves facing the first, second and third axes 118, 120 and 143 of their respective openings 106, 108 and 139. The grooves 146 may be described as splitting the ribs in two lengthwise and thereby providing a wider footprint of engagement with the outer surfaces of the pipe elements and increasing the bending stiffness of the joint. Grooves 146 also provide a region for the addition of retainer rings 148 (see FIG. 7). Retainer rings 148 are confined within the grooves 146 and have a plurality of teeth 150 that project toward the axes 118, 120 and 143 of their respective openings 106, 108 and 139. The teeth 150 bite into plain end pipe and increase the mechanical engagement between the Tee fitting 100 and the pipe elements and better resist axial forces that would otherwise separate the pipe elements from the fitting. It is advantageous for rings 148 to comprise two arcuate sections (which may or may not be semi-circular). Rings 148 may also be split rings which have a gap allowing the rings to deform into a smaller diameter as the ends 130 and 132 are drawn toward one another. Split rings are advantageous because they grip plain end pipe elements effectively but do not significantly resist the closing of the fitting as the ends 130 and 132 are brought together. For the grooves 146 surrounding the third opening 139 as shown in FIG. 7, the use of a two-part ring 151 is particularly advantageous.

Figure 8:
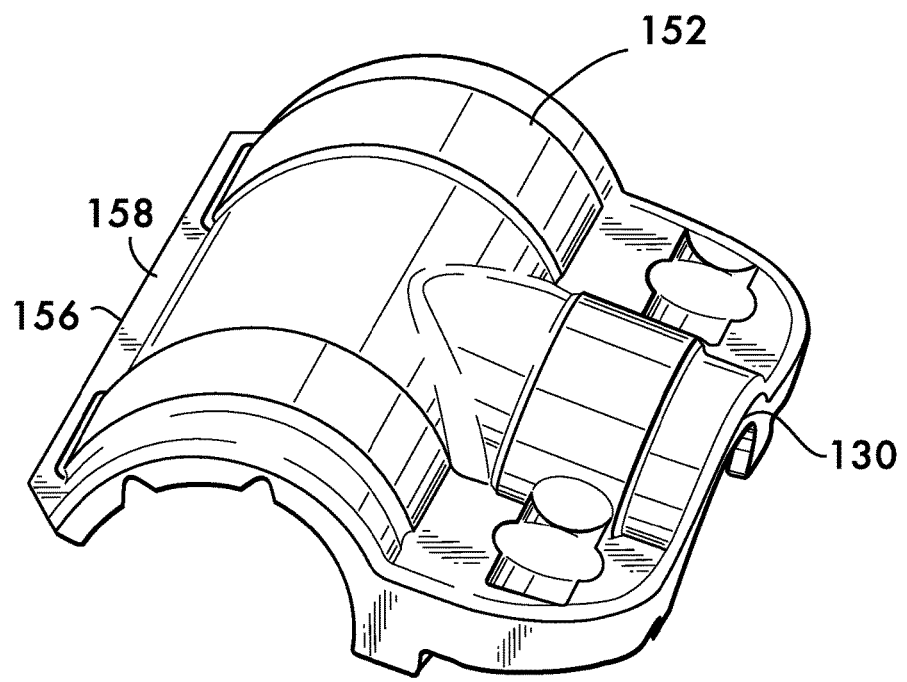
FIG. 8 is an isometric view of a component of the fitting shown in FIG. 7.
Figure 10:
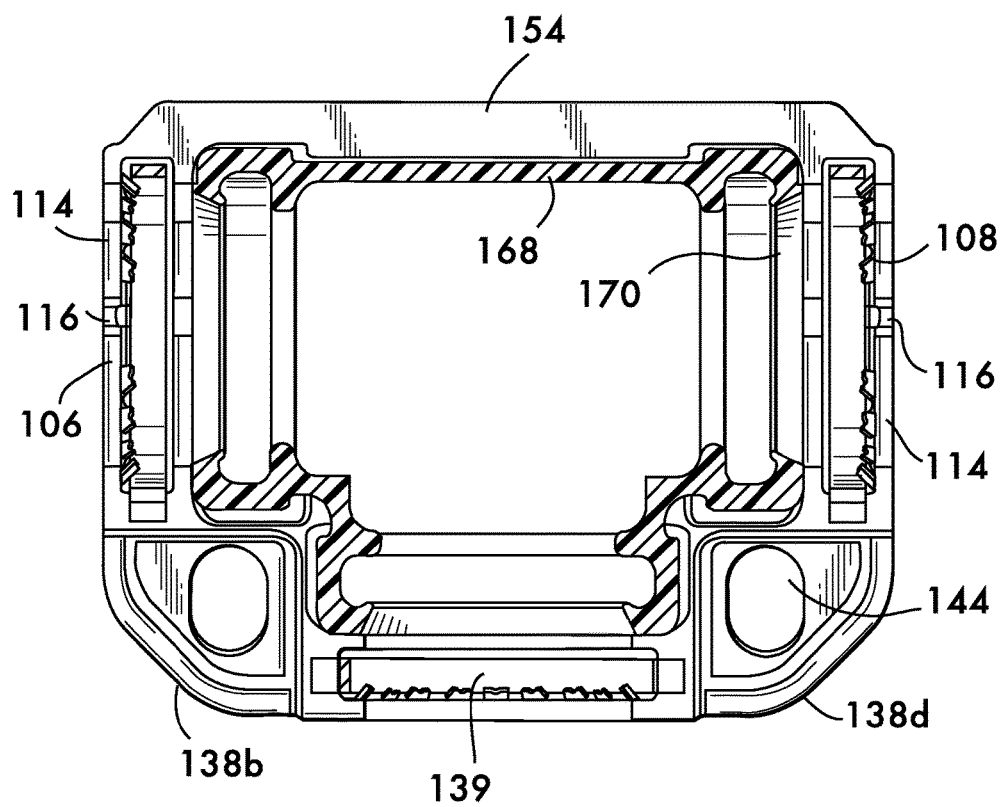
FIG. 10 is a sectional view taken at line 10-10 of FIG. 7.

The Tee fitting according to the invention may have several practical embodiments. Example fitting 100, as shown in FIG. 7, has a body 102 comprising two separate housings 152 and 154, shown in detail in FIGS. 8 and 9. First housing 152 (FIG. 8) includes the first end 130 of body 102. The end 156 of housing 152 opposite end 130 comprises a projection 158 that extends along the end 156 of the housing 152. Second housing 154 (FIG. 9) includes the second end 132 of the body 102 and, at its end 160 opposite end 132, includes a channel 162. Channel 162 extends along end 160 of second housing 154 and cooperates with the projection 158 to form a joint 164, shown in FIG. 7 and in detail in FIG. 4. Joint 164 retains the housings 152 and 154 to one another. As shown in FIG. 4, channel 162 receives the projection 158, the projection having a chamfered edge 166 to aid its insertion into position within the channel 162 when the housings 152 and 154 are assembled to form the body 102. The joint 164 permits the housings 152 and 154 to be located in spaced apart relation sufficient to insert pipe elements through the openings 106, 108 and 139 and into the central space 104. As shown in FIG. 10, a gasket 168 is captured between the housings 152 and 154. Gasket 168 may be made of resilient, elastic material, for example, rubber compounds, and extends between the first, second and third openings 106, 108 and 139 of the body 102. The gasket 168 has conical inner surfaces 170 that effect a fluid tight seal between the gasket 168 and the pipe elements to form a fluid-tight joint. The fluid tight joint between the pipes and the Tee fitting 100 is effected once the pipe elements are inserted and the first and second ends 130 and 132 are drawn toward one another by adjustable tightening of the connection members 134 and 136, for example, via bolts 140 (see FIG. 7). The gasket 168 is thereby compressed, effecting the seal between the pipes and the body 102. During tightening of the connection members 134 and 136 the housings 152 and 154 deform primarily at the gaps 116 between the ribs 114 to accommodate the pipe elements being joined by the Tee fitting 100. In the example fitting shown in FIG. 7, there are three ribs 114 separated by two gaps 116 on each housing 152 and 154. Note that the gaps 116 are not necessarily positioned symmetrically about the openings 106 and 108, nor does each rib 114 necessarily have the same length, some ribs being shorter than others. The lengths of the ribs 114 and the positioning of the gaps 116 are variables of the design used to control the deformation of the housings to ensure a fluid tight joint. In this example, the asymmetrical positioning of gaps 116 coupled with shorter ribs 114 positioned near the joint 164 concentrate the deformation of the housings 152 and 154 in the portion of the body 102 proximate to the joint. Other designs, both symmetric and asymmetric, with ribs of equal and unequal length, are of course feasible.

Figure 11:
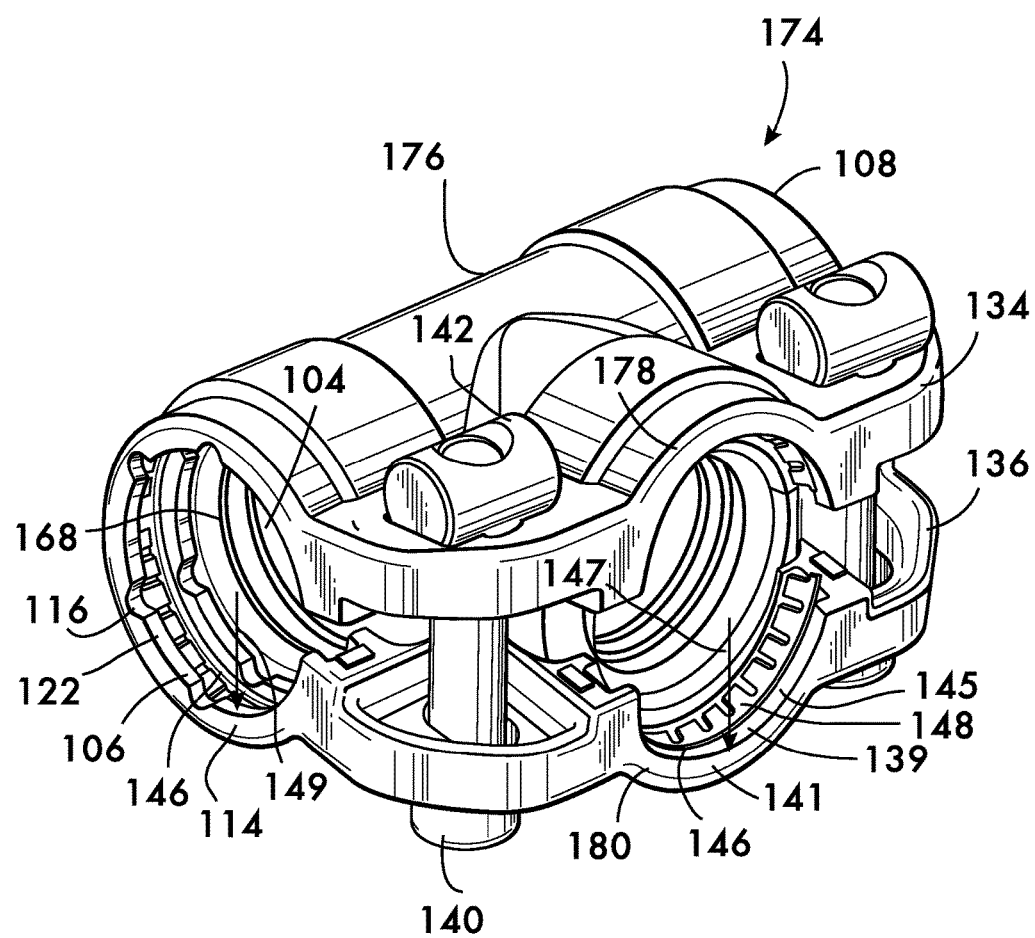
FIG. 11 is an isometric view of another example embodiment of a Tee fitting according to the invention.

FIG. 11 illustrates another Tee fitting embodiment 174. Fitting 174 comprises a unitary body 176 surrounding the central space 104 that receives the pipe elements. Similarly to the fittings 10 and 100 described above, a plurality of arcuate ribs 114 surround the openings 106, 108 and 139 defined by the body 176. The unitary body 176 deforms primarily at the gaps 116 between the ribs 114, and the surfaces 122, 145, 124 (not shown) of the ribs 114 and 141 have radii of curvature 147 (surface 145) and 149 (surface 122) substantially equal to the pipe elements being joined by the fitting 174 when the ribs are in an undeformed state. In this embodiment, ribs 114 and 141 may have grooves 146 in which toothed retaining rings 148 may be positioned. Adjustably tightenable connection members 134 and 136 are positioned at first and second ends 178 and 180, and a fastener, such as the bolts 140 and nuts 142 may be used to effect the adjustable tightening and draw the ends 178 and 180 toward one another to effect a pipe joint. Fluid tight sealing is provided by a gasket 168 as described above. Example Tee fitting 174 has five ribs 114 separated by four gaps 116 surrounding openings 106 and 108 on each side of the body 176. Again, the gaps 116 are asymmetrically distributed about the openings 106 and 108, and the ribs are not all the same length. Other designs are of course feasible.

FIGS. 12-16 illustrate a method of joining pipe elements using elbow and Tee fittings according to the invention, the method illustrated being for the elbow fitting, the method being similar for the Tee fitting.

Figure 12:
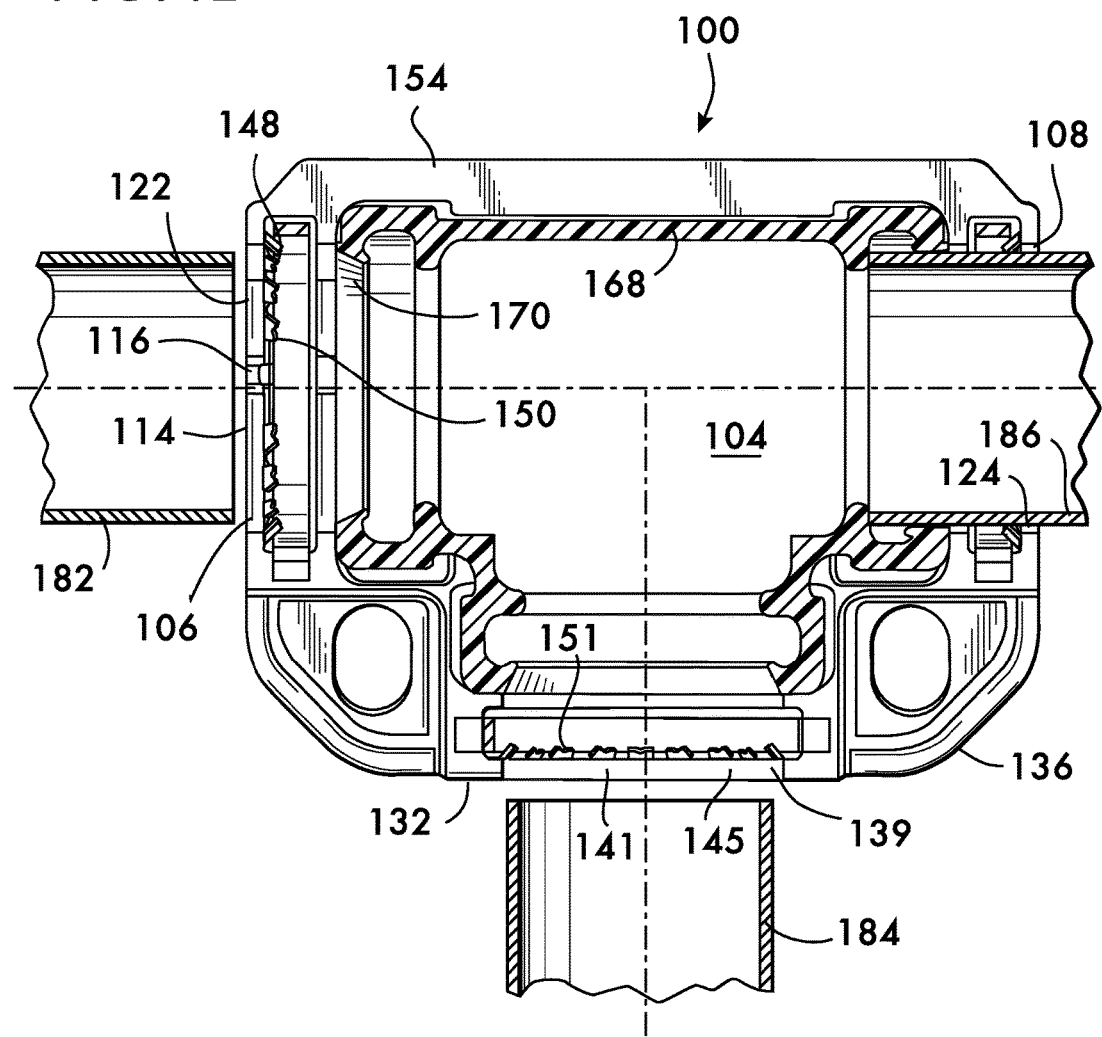
FIGS. 12-16 illustrate an example method of using fittings according to the invention.
Figure 13:
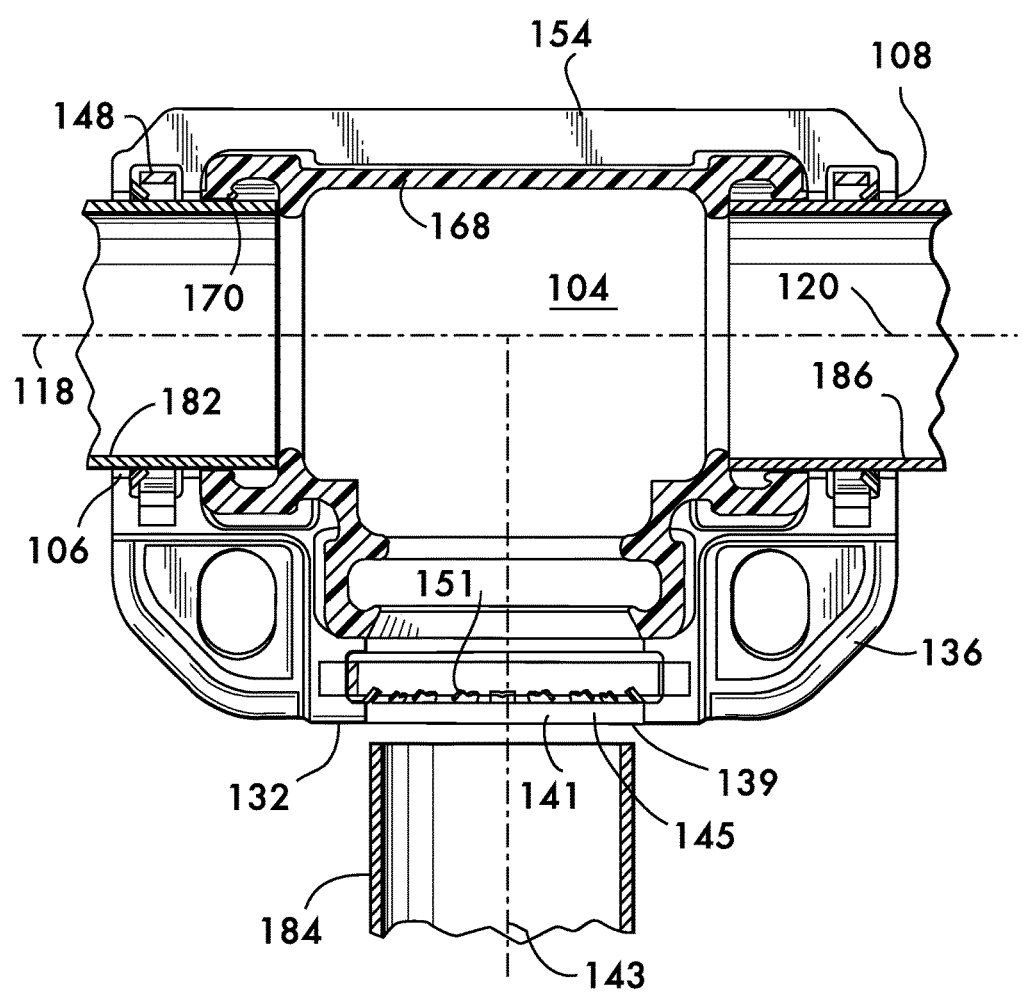
Figure 14:
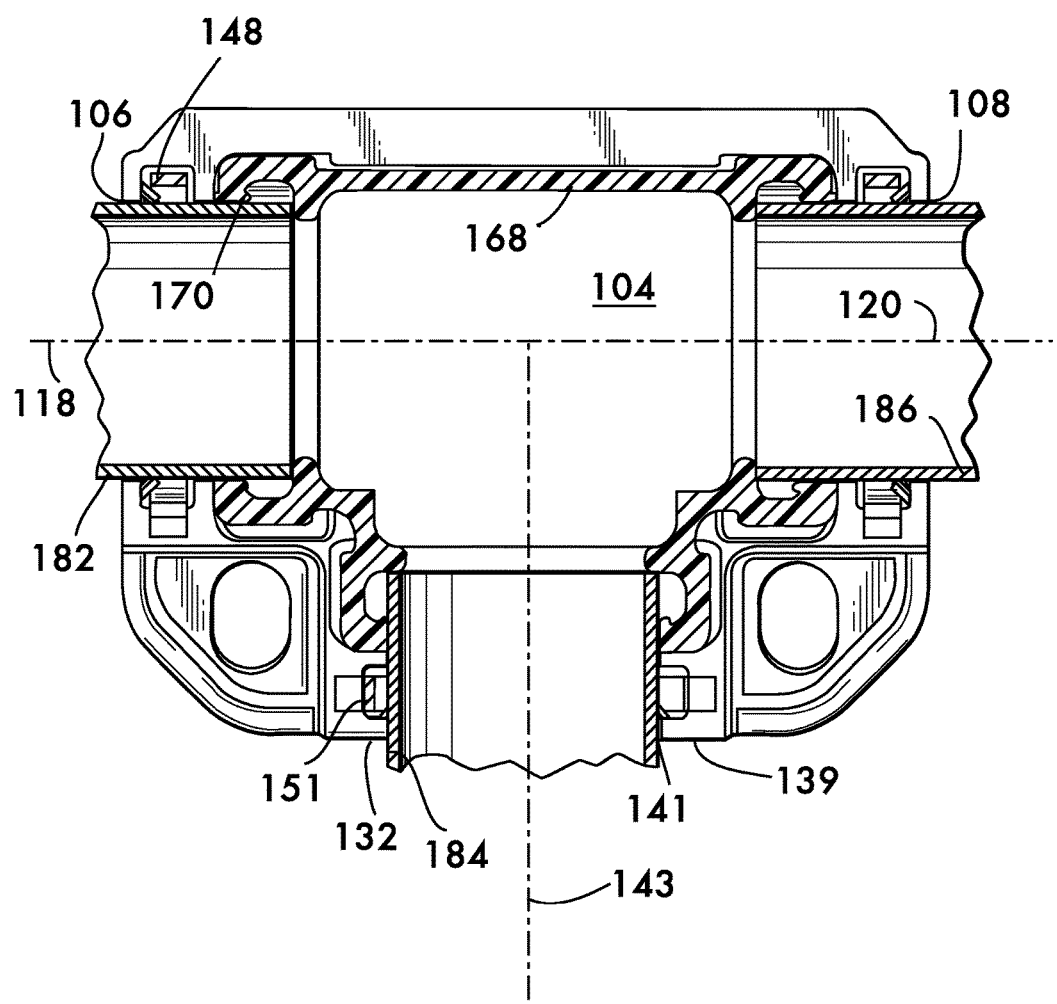
Figure 15:
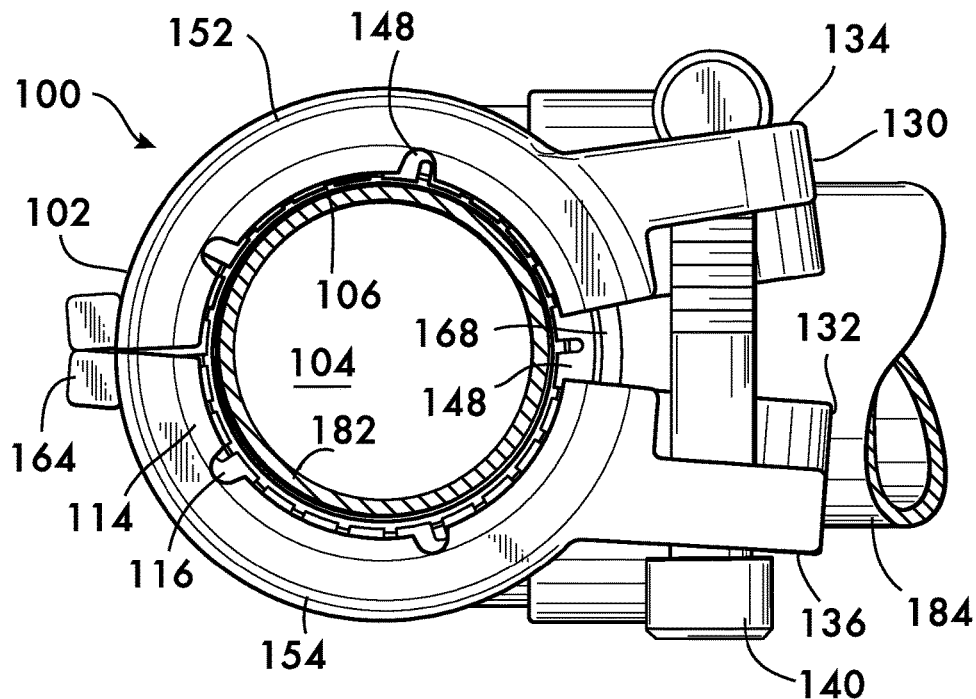
Figure 16:
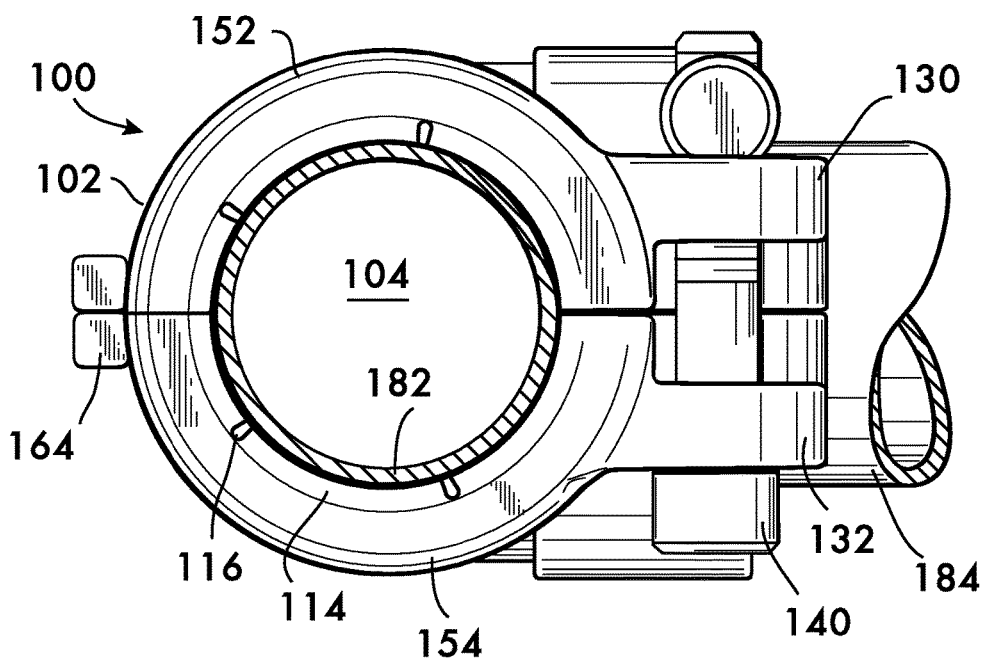

As shown in FIGS. 12 and 15, the fitting 100 is provided pre-assembled, with housings 152 and 154 joined to one another and supported on gasket 168 in an open configuration sufficient to permit the pipe elements 182, 184 and 186 to be inserted into openings 106, 108 and 139. As shown in FIG. 13, the pipe elements 182, 184 and 186 are inserted into the central space 104, where the pipe elements engage the conical surfaces 170 of gasket 168. As shown in FIGS. 14 and 16, the ends 130 and 132 are drawn toward one another by adjustably tightening connection members 134 and 136 using bolts 140. As ends 130 and 132 of housings 152 and 154 are drawn together, body 102 deforms, primarily at gaps 116 between the ribs 114 so as to engage the surfaces 122, 124, 145 of the ribs 114, 141 with the outer surfaces of the pipe elements 182, 184 and 186 (see also FIG. 12). Gasket 168 is thereby also compressed to form a fluid tight seal between the pipe elements and the body 102, the sealing surfaces being between the outer surfaces of pipe elements 182, 184, 186 and conical surfaces 170 of gasket 168. When retainer rings 148 and 151 are present, they are compressed as the ends 130, 132 are drawn together so that the teeth 150 are forced into engagement with the pipe elements to provide additional mechanical engagement.

What is claimed is:

1. A fitting for joining pipe elements together, said fitting comprising:

a body surrounding a central space for receiving said pipe elements, said body defining first and second openings respectively positioned on first and second sides of said body for receiving said pipe elements;

said body having a plurality of first arcuate ribs positioned end to end surrounding said first opening, a gap being positioned between adjacent pairs of said first arcuate ribs, each of said first arcuate ribs projecting toward a first axis oriented coaxially with said first opening, each of said first arcuate ribs having a surface facing said first axis, said surfaces on each of said first arcuate ribs having a radius of curvature substantially equal to a radius of curvature of an outer surface of said pipe elements when said first arcuate ribs are in an undeformed state;

said body having a plurality of second arcuate ribs positioned end to end surrounding said second opening, a gap being positioned between adjacent pairs of said second arcuate ribs, each of said second arcuate ribs projecting toward a second axis oriented coaxially with said second opening, each of said second arcuate ribs having a surface facing said second axis, said surfaces on each of said second arcuate ribs having a radius of curvature substantially equal to a radius of curvature of an outer surface of said pipe elements when said second arcuate ribs are in an undeformed state; wherein said first axis is not coaxially aligned with said second axis;

said body further having first and second ends positioned in facing relation and connection members positioned on said first and second ends, said connection members being adjustably tightenable for drawing said first and second ends toward one another, said body being deformable in said gaps between each of said first and second arcuate ribs and allowing said first and second ends to move toward one another upon adjustable tightening of said connection members, said surfaces on each of said first and second arcuate ribs thereby being brought into engagement with said outer surfaces of said pipe elements while in said undeformed state.

2. The fitting according to claim 1, wherein said body is a unitary body.

3. The fitting according to claim 2, comprising five of said arcuate ribs and four of said gaps surrounding each of said first and second openings.

4. The fitting according to claim 1, wherein said body comprises at least three of said first arcuate ribs, wherein said gaps associated with said at least three of said first arcuate ribs are asymmetrically positioned about said first opening.

5. The fitting according to claim 1, wherein at least one of said ribs has a length less than another of said ribs.

6. The fitting according to claim 1, wherein said surfaces of each of said arcuate ribs are substantially flat.

7. The fitting according to claim 1, wherein said surfaces of each of said arcuate ribs have a knife edge shape.

8. The fitting according to claim 1, wherein said body comprises:
   a first housing including said first end of said body;
   a second housing, separate from said first housing, said second housing including said second end of said body;
   said first housing having a third end positioned opposite to said first end;
   said second housing having a fourth end positioned opposite to said second end;
   a joint attaching said third and fourth ends to one another.

9. The fitting according to claim 8, wherein said joint comprises:
   a channel extending along at least a portion of said fourth end of said second housing;
   a projection extending along at least a portion of said third end of said first housing, said projection interfitting within said channel.

10. The fitting according to claim 8, wherein each of said first and second housings comprises three of said arcuate ribs and two of said gaps on each side thereof.

11. The fitting according to claim 8, wherein said gaps are asymmetrically positioned about said openings.

12. The fitting according to claim 8, wherein at least one of said ribs has a length less than another of said ribs.

13. The fitting according to claim 8, further comprising a first groove extending lengthwise along said plurality of first arcuate ribs, said first groove facing said first axis.

14. The fitting according to claim 13, further comprising a first ring positioned within said first groove and surrounding said first opening, said first ring having a plurality of teeth projecting toward said first axis.

15. The fitting according to claim 14, wherein said first ring comprises at least two arcuate sections.

16. The fitting according to claim 14, further comprising:
   a second groove extending lengthwise along said plurality of second arcuate ribs, said second groove facing said second axis;
   a second ring positioned within said second groove, said second ring having a plurality of teeth projecting toward said second axis.

17. The fitting according to claim 1, further comprising a gasket positioned within said central space between said sides, said gasket surrounding said central space and being engageable with said pipe elements for sealingly joining said pipe elements.

18. The fitting according to claim 1, wherein said connection members comprise a pair of projections, one said projection being positioned on each of said first and second ends of said body, said projections having holes to receive a fastener, said fastener being adjustably tightenable for drawing said first and second ends toward one another.

19. The fitting according to claim 18, wherein said fastener comprises a bolt and a nut.

20. The fitting according to claim 1, further comprising a first groove extending lengthwise along said plurality of first arcuate ribs, said first groove facing said first axis.

21. The fitting according to claim 20, further comprising a first ring positioned within said first groove and surrounding said first opening, said first ring having a plurality of teeth projecting toward said first axis.

22. The fitting according to claim 21, wherein said first ring comprises at least two arcuate sections.

23. The fitting according to claim 21, further comprising:
   a second groove extending lengthwise along said plurality of second arcuate ribs, said second groove facing said second axis;
   a second ring positioned within said second groove, said second ring having a plurality of teeth projecting toward said second axis.

24. The fitting according to claim 1, wherein said first axis is oriented to said second axis at an angle of about 90°.

* * * * *